United States Patent [19]

Minami et al.

[11] Patent Number: 4,843,433
[45] Date of Patent: Jun. 27, 1989

[54] AUTOMATIC DOCUMENT FEEDER

[75] Inventors: Hisashi Minami, Yamatokoriyama; Hideo Matsuda; Yoichi Shimazawa, both of Nara; Shinitiro Hiraoka, Yamatotakada, all of Japan

[73] Assignee: Sharp Kabushiki Kaisha, Osaka, Japan

[21] Appl. No.: 161,339

[22] Filed: Feb. 19, 1988

Related U.S. Application Data

[63] Continuation of Ser. No. 849,021, Apr. 7, 1986, abandoned.

[30] Foreign Application Priority Data

Apr. 10, 1985 [JP] Japan ................... 60-53842
Apr. 11, 1985 [JP] Japan ................... 60-78009
Apr. 13, 1985 [JP] Japan ................... 60-79021
May 27, 1985 [JP] Japan ................... 60-114782

[51] Int. Cl.$^4$ ............................ G03B 27/612
[52] U.S. Cl. ...................... 355/49; 271/277; 346/138; 355/76
[58] Field of Search .................. 355/47, 75, 76; 346/138; 271/277

[56] References Cited

U.S. PATENT DOCUMENTS

| | | | |
|---|---|---|---|
| 3,618,123 | 11/1971 | Buddendeck | 346/138 |
| 3,906,512 | 9/1975 | Farlow | 346/138 |
| 3,918,707 | 11/1975 | Villemer | 346/138 |
| 4,056,263 | 11/1977 | La White | 346/138 |
| 4,227,219 | 10/1980 | Takemoto . | |
| 4,390,176 | 6/1983 | Kato | 271/277 X |
| 4,411,511 | 10/1983 | Ariyama | 271/311 X |

FOREIGN PATENT DOCUMENTS

| | | |
|---|---|---|
| 2645624 | 10/1970 | Fed. Rep. of Germany . |
| 2409209 | 9/1974 | Fed. Rep. of Germany ...... 271/311 |
| 2742181 | 9/1977 | Fed. Rep. of Germany . |

*Primary Examiner*—Richard A. Schacher
*Attorney, Agent, or Firm*—Birch, Stewart, Kolasch & Birch

[57] ABSTRACT

An automatic document feeder including an automatic sheet winding device and an exposure device. The automatic sheet winding device includes a rotary drum and a sheet clamping device for clamping the original sheet wound around a circumferential face of the rotary drum such that a sheet clamping region and an exposure region on the circumferential face of the rotary drum are circumferentially spaced from each other.

2 Claims, 9 Drawing Sheets

AUTOMATIC DOCUMENT FEEDER

This application is a continuation of application of Ser. No. 849,021 Filed on April 7, 1986, abandoned.

BACKGROUND OF THE INVENTION

The present invention generally relates to recording apparatus and more particularly, to an automatic document feeder (ADF) for use in a copying apparatus, a facsimile telegraph, a microfilm printer, etc., which is provided with an automatic sheet winding device. The automatic sheet winding device includes a rotary drum having a sheet retaining claw for retaining an original sheet, and a sheet clamping means for clamping the original sheet wound around a circumferential face of the rotary drum so as to automatically wind the original sheet around the circumferential face of the rotary drum such that the original sheet is subjected to exposure through the sheet clamping means by an exposure device, with the sheet retaining claw being provided on the circumferential face of the rotary drum.

Conventionally, in a high-speed copying apparatus, there is provided an automatic document feeder (ADF) in which after the contents of an original sheet wound automatically around a rotary drum have been read through exposure of the original sheet during rotation of the rotary drum, the original sheet is ejected from the rotary drum. The known ADF includes an automatic sheet winding device. In the known automatic sheet winding device, although it is most desirable that the original sheet and the rotary drum are brought into close contact with each other, such a phenomenon inevitably takes place that the original sheet deviates from the surface of the rotary drum due to stiffness of the original sheet.

Figure 1:
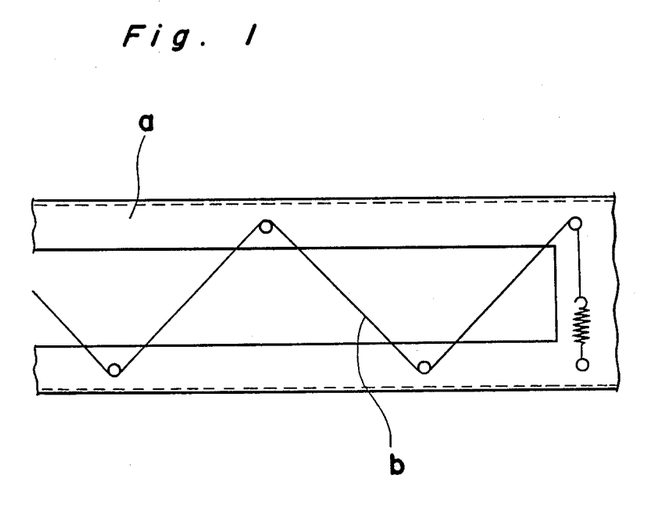
FIG. 1 is a fragmentary elevational view of a sheet clamping device of an automatic sheet winding device for use in an automatic document feeder (ADF) proposed previously by the assignee assigned by the present inventors (already referred to)
Figure 2:
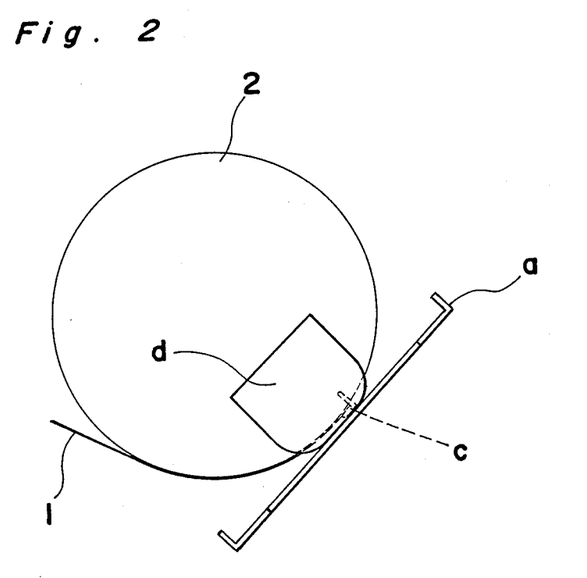
FIG. 2 is a schematic view explanatory of a drawback of the sheet clamping device of FIG. 1 (already referred to)

Thus, the assignee assigned by the present inventors proposed in Japanese Patent Application No. 185123/1984, an automatic sheet winding device in which an original sheet is clamped onto a circumferential face of a rotary drum by using a sheet clamp as shown in FIG. 1. The sheet clamp includes a frame member a having a linear member b such as a wire extended thereon and a clamp region of the original sheet is subjected to exposure from above the sheet clamp such that the original sheet is prevented from deviating from the circumferential surface of the rotary drum. However, in this automatic sheet winding device, in order to prevent the wire b from being cut off by a sheet retaining claw c provided on the rotary drum as shown in FIG. 2, it is required to be so arranged that, for example, a cam d is provided on a side face of the drum so as to space the sheet clamp away from the circumferential face of the drum when the claw c passes by the sheet clamp. Hence, this automatic sheet winding device has such a drawback that when the sheet clamp has been spaced away from the circumferential face of the rotary drum, a portion of the original sheet adjacent to the sheet retaining claw c is relieved of a pressing force and thus, deviates from the circumferential face of the rotary drum, thereby resulting in improper focusing of images of the original sheet at the time of exposure of the original sheet.

Figure 3:
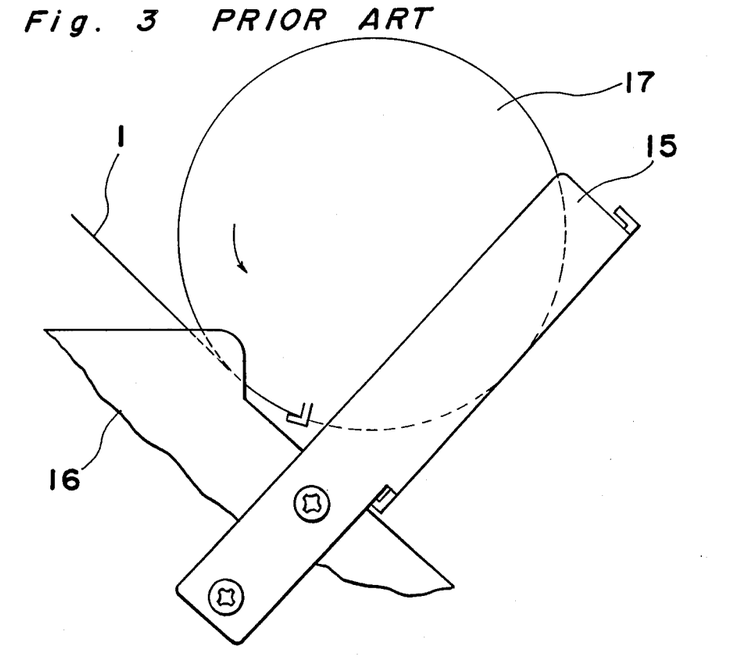
FIG. 3 is a side elevational view of a prior art sheet clamping device (already referred to)

Furthermore, in a prior art ADF, a sheet clamping device for clamping an original sheet wound around a rotary drum is provided in an automatic sheet winding device and is mounted on a fixed member so as to prevent the original sheet wound around the rotary drum from deviating from the rotary drum. However, as shown in FIG. 3, the prior art sheet clamping device has been disadvantageous in that since a clamp member 15 for clamping the original sheet is fixedly mounted on a fixed member 16 such as a frame by machine screws, it is difficult to position the clamp member 15 relative to a rotary drum 17 and it is troublesome to remove the clamp member 15 from the fixed member 16.

Moreover, in a further prior art ADF, a claw for gripping an original sheet is provided in an axial direction of a rotary drum so as to grip a leading edge of the original sheet fed by rollers. Thus, the prior art ADF has such a problem that when the original sheet is fed to the claw obliquely, the claw fails to grip the original sheet. In order to solve such a problem of the prior art ADF, various methods for compensating for oblique feed of the original sheet have been proposed. However, even if these methods are employed, such a case happens that the original sheet is fed obliquely again after compensation of oblique feed of the original sheet. In this case, improper winding of the original sheet around the rotary drum cannot be eliminated completely.

In addition, another known ADF includes a detecting device for detecting a transport state of an original sheet through utilization of detection signals from a plurality of sheet sensors provided on a transport path of the original sheet. For example, in a known copying apparatus, etc., a sheet transport mechanism is employed in which the original sheet placed on the transport path is transported. In the known sheet transport mechanism, a detecting means for detecting presence and absence of the transported original sheet is provided but is not capable of properly detecting the transport state of the original sheet.

SUMMARY OF THE INVENTION

Accordingly, an essential object of the present invention is to provide an automatic document feeder (ADF) including an automatic sheet winding device for automatically winding an original sheet around a rotary drum, in which automatic sheet winding device a sheet clamping region and an exposure region of a rotary drum are only slightly circumferentially spaced away from each other such that the original sheet is prevented from deviating from the rotary drum at the exposure region, with substantial elimination of the disadvantages inherent in conventional ADFs of this kind.

A further object of the present invention is to provide an ADF of the above described type in which a sheet clamping device for clamping the original sheet wound around the rotary drum can be easily mounted on a fixed member and a clamp position of a sheet clamping member of the sheet clamping device is not requied to be determined relative to the rotary drum.

Another object of the present invention is to provide an ADF including an automatic sheet winding device in which after the original sheet has been deflected upon its contact with a claw for gripping the original sheet, a leading edge of the original sheet is gripped by the claw such that the original sheet is positively wound around the rotary drum.

Still another object of the present invention is to provide an ADF including a detecting device for detecting a transport state of the original sheet, which detecting device is capable of detecting an improper transport state of the original sheet transported obliquely relative to a predetermined transport direction of the original sheet.

In order to accomplish these objects of the present invention, an automatic document feeder (ADF) for automatically feeding an original sheet, according to one preferred embodiment of the present invention comprises: an automatic sheet winding device including a rotary drum and a sheet clamping means for clamping said original sheet wound around a circumferential face of said rotary drum such that said original sheet is automatically wound around said circumferential face of said rotary drum by said automatic sheet winding device; said rotary drum being provided, on said circumferential face, with a claw for retaining said original sheet; and an exposure device for subjecting said original sheet to exposure through said sheet clamping means; said rotary drum having, on said circumferential face, a sheet clamping region defined by said sheet clamping means and an exposure region defined by said exposure device such that said sheet clamping region and said exposure region are only slightly circumferentially spaced away from each other.

In accordance with the present invention, since it becomes possible to remarkably easily prevent the original sheet from deviating from the rotary drum at the exposure region, improper focusing of images of the original sheet at the time of exposure of the original sheet can be prevented, thereby resulting in clear recorded images.

BRIEF DESCRIPTION OF THE DRAWINGS

These objects and features of the present invention will become apparent from the following description taken in conjunction with the preferred embodiments with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
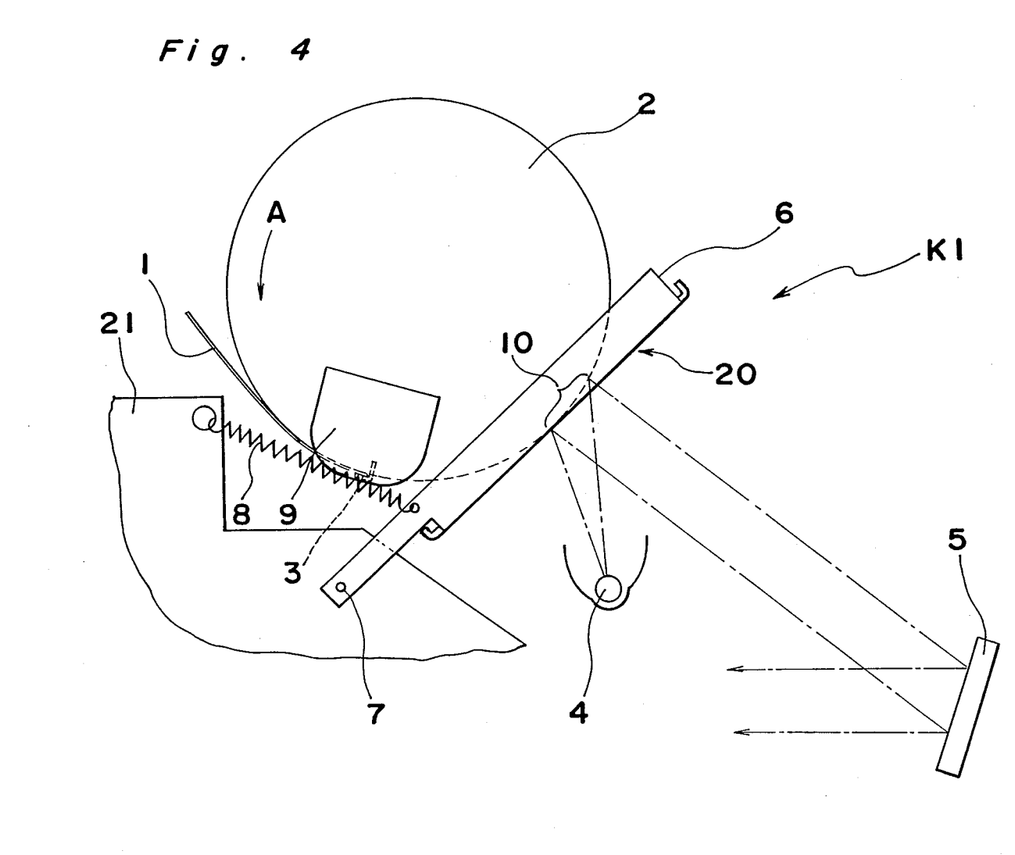
FIG. 4 is a schematic side elevational view of an automatic sheet winding device for use in an ADF according to a first embodiment of the present invention.
Figure 5:
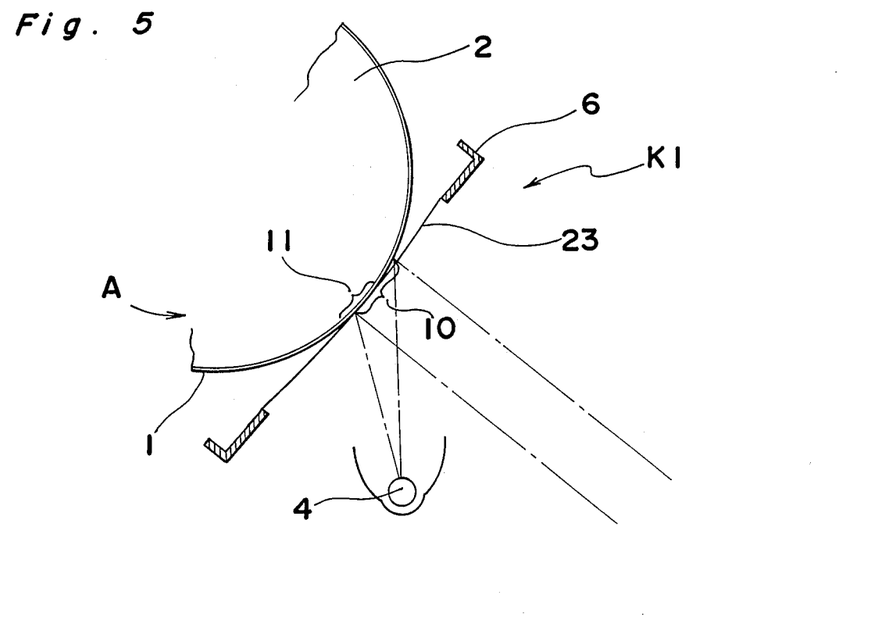
FIG. 5 is a fragmentary detail view of the automatic sheet winding device of FIG. 4.

Referring now to the drawings, there is shown in FIG. 4 and 5, an automatic document feeder (ADF) K1 for automatically feeding an original sheet 1, according to a first embodiment of the present invent invetion. The ADF K1 includes an exposure lamp 4, a reflecting mirror 5 and an automatic sheet winding device. The automatic sheet winding device includes a rotary drum 2 provided, on its circumferential face, with a claw 3 for retaining a leading edge of the original sheet 1, a sheet clamping device 20 for bringing the original sheet 1 into close contact wiht the rotary drum 2 and a cam 9 for spacing the sheet clamp 6 away from the circumferential face of the rotary drum 2. The sheet clamping device 20 includes a sheet clamp 6 having a linear member 23 such as a wire extended thereon and a coiled spring 8. The sheet clamp 6 is pivotally mounted on a fixed member 21 such as a frame through a pin member 7 driven into the sheet clamp 6. The rotary drum 2 is rotated in the direction of the arrow A of FIG. 4. An exposure region 10 of the circumferential face of the rotary drum 2 is irradiated by the exposure lamp 4. Data concerning a color shade of images of the original sheet 1 are delivered to a photosensitive member (not shown), etc. via the reflecting mirror 5.

Meanwhile, the sheet clamp 6 is urged, at the exposure region 10, towards the rotary drum 2 by the coiled spring 8 so as to be at all times depressed onto the circumferential face of the rotary drum 2 by an urging force of the coiled spring 8. The coiled spring 8 is attached, at its one end, to the frame 21. The cam 9 is mounted on a side face of the rotary drum 2 so as to be disposed at a circumferential position corresponding to that of the claw 3.

As shown in FIG. 5, the original sheet 1 is clamped, at a sheet clamping region 11 of the circumferential face of the rotary drum 2, onto the circumferential face of the rotary drum 2. It should be noted that the sheet clamping region 11 is slightly spaced away from the exposure region 10 in the direction opposite to the rotational direction A of the rotary drum 2. Namely, it is so arranged that the sheet clamping region 11 occupies an initial portion of the exposure region 10.

In the automatic sheet winding device of the ADF K1, when a leading edge of the original sheet 1, namely the claw 3 passes through the sheet clamping region 11, the sheet clamp 6 is pushed radially outwardly by the cam 9 so as to be spaced away from the circumferential face of the rotary drum 2. However, subsequently when the leading edge of the original sheet 1 passes through the exposure region 10, the original sheet 1 is clamped onto the circumferential face of the rotary drum 2 by the sheet clamp 6. Thus, the original sheet 1 is tensed by a frictional force between the original sheet 1 and the wire 23 of the sheet clamp 6 and through rotation of the rotary drum 2 so as to be brought into close contact, at the exposure region 10, with the circumferential face of the rotary drum 2. Accordingly, since the sheet clamping region 11 is disposed slightly circumferentially forward of the exposure region 10, it becomes possible to prevent the original sheet 1 from deviating from the rotary drum 2 at the exposure region 10 and improper focusing of the images of the original sheet 1 can be eliminated. Meanwhile, since the wire 23 extended on the sheet clamp 6 has elasticity to some extent and is capable of clamping the original sheet over a certain width onto the circumferential face of the rotary drum 2, it becomes possible to positively clamp also a trailing edge of the original sheet 1 onto the circumferential face of the rotary drum 2 at the exposure region 10.

As is clear from the foregoing description, in the automatic sheet winding device of the ADF K1, since the rotary drum 2 has, on its circumferential face, the sheet clamping region 11 defined by the sheet clamping device 20 and the exposure region 10 defined by the exposure device 4 such that the sheet clamping region 11 and the exposure region 10 are circumferentially spaced away from each other, it becomes possible to prevent the original sheet 1 from deviating form the rotary drum 2 at the exposure region 10 with much ease and thus, improper focusing of the images of the original sheet 1 at the time of exposure of the original sheet 1 can be prevented, thereby resulting in clear recorded images.

Figure 6:
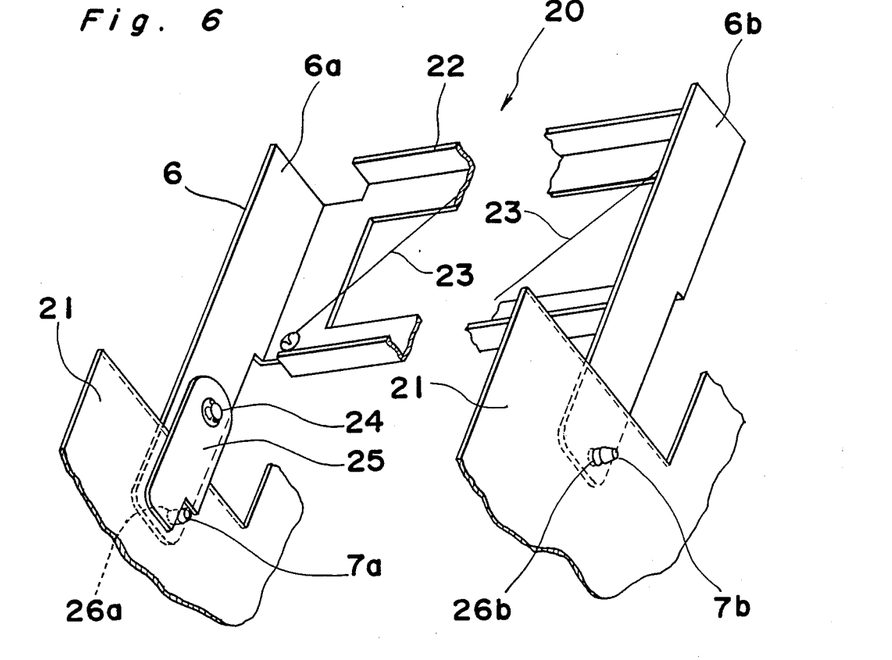
FIG. 6 is a partially broken perspective view of a sheet clamping device employed in the automatic sheet winding device of FIG. 4.
Figure 7:
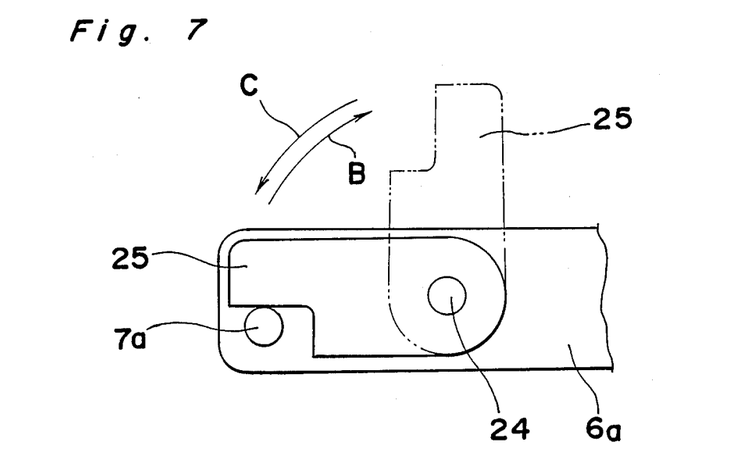
FIG. 7 is an enlarged fragmentary detail view of the sheet clamping device of FIG. 6.

Hereinbelow, the sheet clamping device 20 will be described in more detail with reference to FIG. 6 and 7. The sheet clamping device 20 includes the sheet clamp 6 and the coiled spring 8 as referred to earlier. The sheet clamp 6 includes a pair of arms 6a and 6b pivotally mounted on the frame 21 and a coupling portion 22 for coupling the arms 6a and 6b. The linear member 23 such as the wire is extended on the coupling portion 22 so as to be brought into contact with the original sheet 1. The sheet clamping device 20 is mounted on the frame 21 as follows. The pin member 7 includes pins 7a and 7b. The pins 7a and 7b are driven into the arms 9a and 9b, respectively. The sheet clamping device 20 further includes a contact plate 25. The contact plate 25 is rotatably mounted on the arm 6a by a shaft 24 so as to be rotated about the shaft 24 into contact with the pin 8a. The arm 6a and the contact plate 25 are spaced a predetermined distance from each other. As shown in FIG. 6, the pins 7a and 7b project in the same direction from the arms 6a and 6b, respectively. Thus, initially, the sheet clamp 6 is pushed towards the frame 21 in one direction such that the pins 7a and 7b are, respectively, fitted into holes 26a and 26b formed on the frame 21. At this time, the contact plate 25 is rotated in the direction of the arrow B to the position shown by the imaginary lines in FIG. 7. Then, when the pins 7a and 7b have been fitted into the holes 26a and 26b, respectively, the contact plate 25 is reversely rotated in the direction of the arrow C to the position shown by the solid lines in FIG. 7 so as to be brought into contact with the pin 7a. Thus, the frame 21 is gripped between the arm 9a and the contact plate 25. As a result, the sheet clamp 6 is fixed in the axial direction of the shaft 24 and thus, the sheet clamping device 20 has been mounted on the frame 21.

As described above, if the sheet clamping device 20 of the present invention is used, the original sheet 1 is at all times depressed onto the cirumferential face of the rotary drum 2 at a constant pressure by the linear member 23 of the sheet clamping device 20 when the original sheet 1 passes through the exposure region 10. Therefore, reading of a whole area of the original sheet 1 and exposure of the original sheet 1 can be performed accurately. Furthermore, by merely rotating the contact plate 25 relative to the arm 6a in the directions B and C, the sheet clamping device 20 can be attached to and detached from the frame 21, respectively.

As is clear from the foregoing, the sheet clamping device 20 of the present invention is mounted on the fixed member 21 so as to clamp the original sheet 1 wound around the rotary drum 2 and comprises: the sheet clamp 6 for clamping the original sheet 1 wound around the circumferential face of the rotary drum 2, which is pivotally mounted on the fixed member 21 so as to be pivoted about the pin member 7 engaged with the fixed member 21; the urging member 8 for urging the sheet clamp 6 towards the rotary drum 2; and the movable member 25 which is movably mounted on the sheet clamp 6 so as to be displaced to a position where the fixed member 21 is gripped between the movable member 25 and the sheet clamp 6 such that the sheet clamping device 20 is mounted on the fixed member 21 by the movable member 25. The sheet clamping device 20 achieves the following effects (1) and (2).

(1) The sheet clamp 6 performing a clamping operation of prevents deviation of the original sheet 1 from the rotary drum 2 through utilization of the urging force of the urging member 8. Therefore, a clamping position of the sheet clamp 6 relative to the rotary drum 2 is not required to be fixed, thus eliminating the need for an operation for fixing the clamping position of the sheet clamp 6.

(2) The sheet clamping device 20 can be detachably mounted on the fixed member 21 easily and rapidly by displacing the movable member 25.

Figure 8:
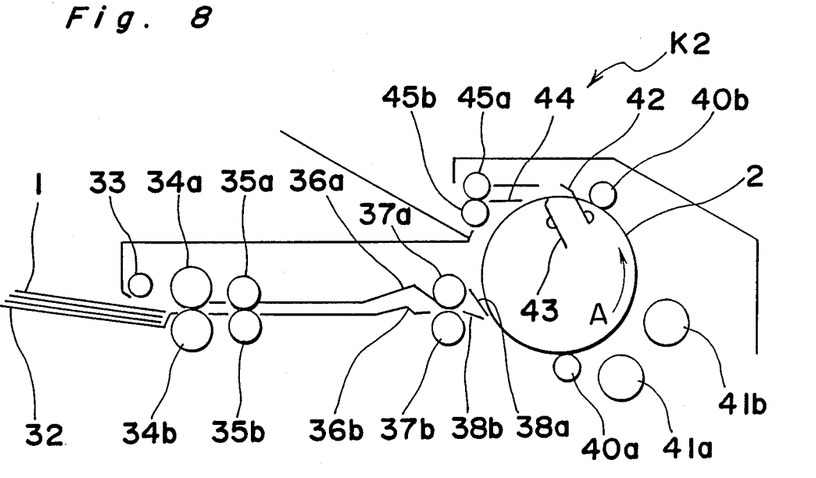
FIG. 8 is a schematic view of an automatic sheet winding device for use in an ADF according to a second embodiment of the present invention.
Figure 9:
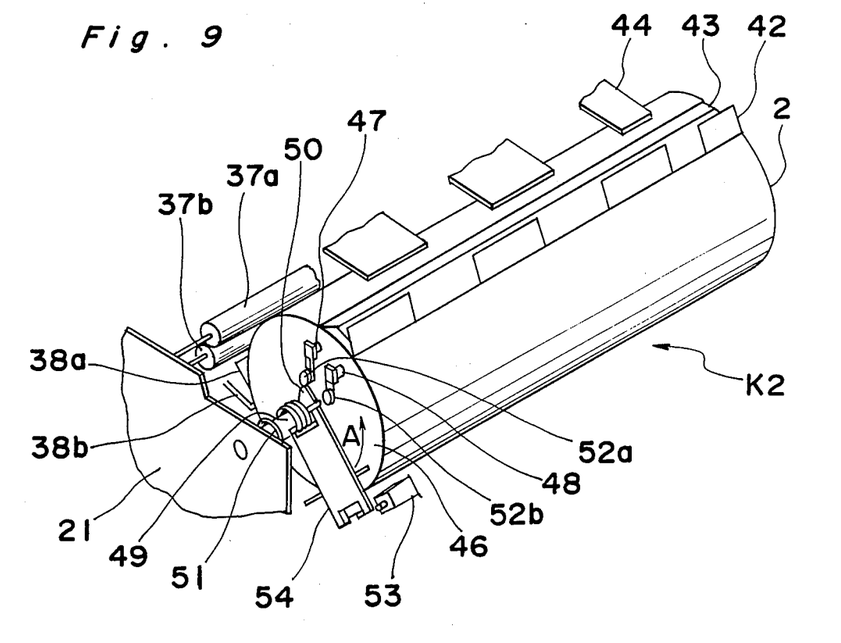
FIG. 9 is a perspective view of a rotary drum employed in the automatic sheet winding device of FIG. 8.
Figure 10:
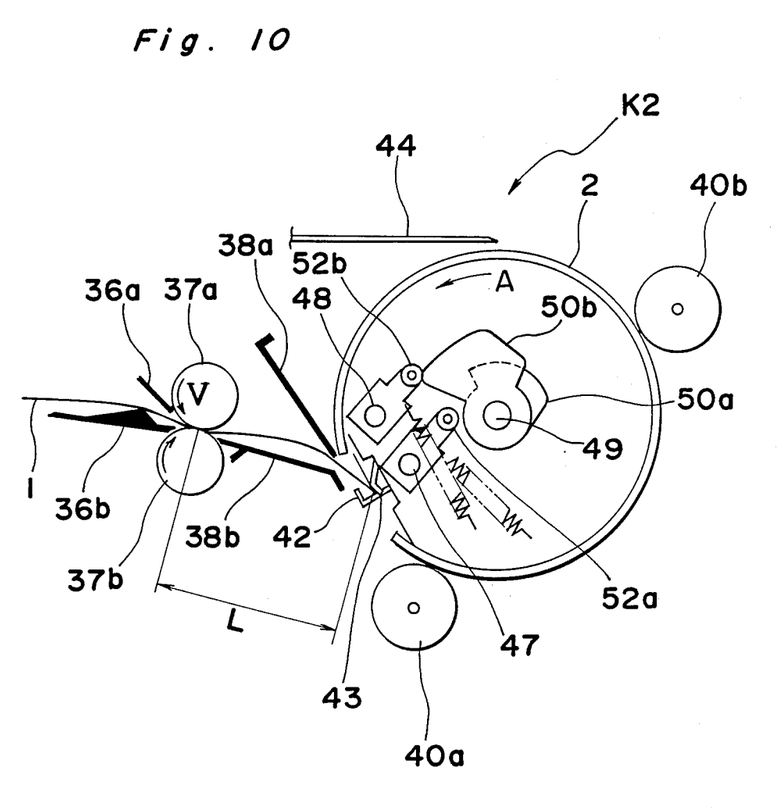
FIG. 10 is a cross-sectional view of the rotary drum of FIG. 9.

Referring to FIGS. 8 to 10, there is shown an automatic document feeder (ADF) K2 according to a second embodiment of the present invention. The ADF K2 sequentially includes an original tray 32 for loading the original sheet 1 thereon, a pickup roller 23, a pair of a forward rotation rollers 34a and a reverse rotation roller 34b, a pair of feed rollers 35a and 35b, plate members 36a and 36b for defining therebetween an angular transport path of the original sheet 1, a pair of timing rollers 37a and 37b and inlet guides 38a and 38b. The transport path of the original sheet 1, which is defined by the plate members 36a and 36b, is formed angularly in the vicinity of the timing rollers 37a and 37b. The ADF K2 further includes the rotary drum 2, a pair of clamp rollers 40a and 40b for clamping the original sheet 1 onto the circumferential face of the rotary drum 2, a pair of light sources 41a and 41b, claws 42 and 43 for gripping the original sheet 1 therebetween, an outlet guide 44 and a pair of discharge rollers 45a and 45b.

The original sheets 1 stacked on the original tray 32 are fed one sheet at a time to the forward and reverse rotation rollers 34a and 34b upon descent of the pickup roller 33 and then, are conveyed from the forward and reverse rotation rollers 34a and 34b to the feed rollers 35a and 35b where compensation of oblique transport of the original sheet 1 is preliminarily performed. Subsequently, the original sheet 1 is conveyed to the claws 42 and 43 through the angular transport path of the original sheet 1 defined by the plate members 36a and 36b, the timing rollers 37a and 37b and the inlet guides 38a and 38b. When the original sheet 1 has been deflected arcuately upon contact of a leading edge of the original sheet 1 with the claws 42 and 43, the leading edge of the original sheet 1 is gripped between the claws 42 and 43. At the same time, the original sheet 1 passes by the light sources 41a and 41b so as to be subjected to exposure while being wound around the circumferential face of the rotary drum 2 upon rotation of the rotary drum 2. When the rotary drum 2 has been rotated a predetermined number of times corresponding to the number of copies to be taken and predetermined operations have been performed, the claws 42 and 43 are opened so as to release the original sheet 1. Thereafter, the original sheet 1 is separated from the circumferential face of the rotary drum 2 by the claw 43 so as to be discharged out of the ADF K2 via the outlet guide 44 and the discharge rollers 45a and 45b.

Hereinbelow, the ADF K2 will be described in more detail with reference to FIGS. 9 and 10. The claws 42 and 43 are, respectively, mounted on shafts 47 and 48 which are rotatably supported on a side plate 46 of the rotary drum 2. Meanwhile, the rotary drum 2 is supported and rotated by a drum shaft 49. A cam member 50, which is constituted by cams 50a and 50b, is supported on the drum shaft 49 fixedly regardless of rotation of the drum shaft 49. Furthermore, a compression coiled spring 51 for urging the cam member 50 towards the side plate 46 is wound around the drum shaft 49.

Moreover, the ADF K2 includes the frame 21, cam followers 52a and 52b, a movable plate 54 for displacing the cam member 50 and a solenoid 53 for displacing the movable plate 54 in the axial direction of the drum shaft 49. It is so arranged that, upon rotation of the rotary drum 2 in the direction of the arrow A, the cam followers 52a and 52b are, respectively, brought into engagement with the cams 50a and 50b so as to rotate the shafts 47 and 48 through a predetermined angle such that opening and closing of the claws 42 and 43 are performed. Meanwhile, the movable plate 54 and the solenoid 53 displace the cam member 50 towards the frame 21 so as to disengage the cam member 50 from the cam followers 52a and 52b such that the rotary drum 2 having the original sheet 1 wound therearound is rotated a preset number of times without releasing the original sheet 1 therefrom.

Hereinbelow, operations of the ADF K2 will be described. In the ADF K2, the original sheet 1 fed by the pickup roller 33 is conveyed, through the forward and rearward rotation rollers 34a and 34b and the feed rollers 35a and 35b, to the transport path defined by the plate members 36a and 36b. At the angular portion of the transport path defined by the plate members 36a and 36b, the original sheet 1 is forcibly bent arcuately and thus, the leading edge of the original sheet 1 is adjusted so as to be accurately fed to a contact point between the timing rollers 37a and 37b. Meanwhile, when the rotary drum 2 has stopped rotating at the position shown in FIG. 10 where the claws 42 and 43 confront the outlet of the inlet guides 38a and 38b, the original sheet 1 is conveyed to the claws 42 and 43 at a speed identical with a peripheral speed V of the timing rollers 37a and 37b upon rotation of the timing rollers 37a and 37b. Supposing that a character L represents a distance from the timing rollers 37a and 37b to the claws 42 and 43, rotation of the rotary drum 2 in the direction of the arrow A is started upon lapse of a time period of $(L/V)$ after start of transport of the original sheet 1 through rotation of the timing rollers 37a and 37b. Furthermore, immediately after rotation of the rotary drum 2, the cam followers 52a and 52b are brought into contact with the cams 50a and 50b, respectively, Thus, the claws 42 and 43 are actuated so as to grip therebetween the leading edge of the original sheet 1.

Namely, in the ADF K2, the original sheet 1 is fed to the claws 42 and 43 by the timing rollers 37a and 37b. Then, when a central portion of the original sheet 1 has been bent arcuately upon contact of the leading edge of the original sheet 1 with the claws 42 and 43, rotation of the rotary drum 2 and grip of the original sheet 1 by the claws 42 and 43 are started. Accordingly, when the claws 42 and 43 are closed, the leading edge of the original sheet 1 is positively introduced between the claws 42 and 43 deeply by a restoring force of the original sheet 1. Thus, it becomes possible to positively grip the leading edge of the original sheet 1 between the claws 42 and 43. In addition, when the original sheet 1 is fed to the claws 42 and 43 obliquely with respect to the transport direction of the original sheet 1, compensation of the oblique transport of the original sheet 1 is performed by the restoring force of the original sheet 1.

As is clear from the foregoing description, in the ADF K2, after timing rollers 37a and 37b have been rotated in order to feed the original sheet 1 to the claws 42 and 43 of the rotary drum 2, the original sheet 1 is gripped between the claws 42 and 43 upon lapse of the time period of $(L/V)$. Accordingly, the original sheet 1 can be positively wound around the rotary drum 2 at all times, thereby resulting in great improvement in reliability of the ADF.

Figure 11:
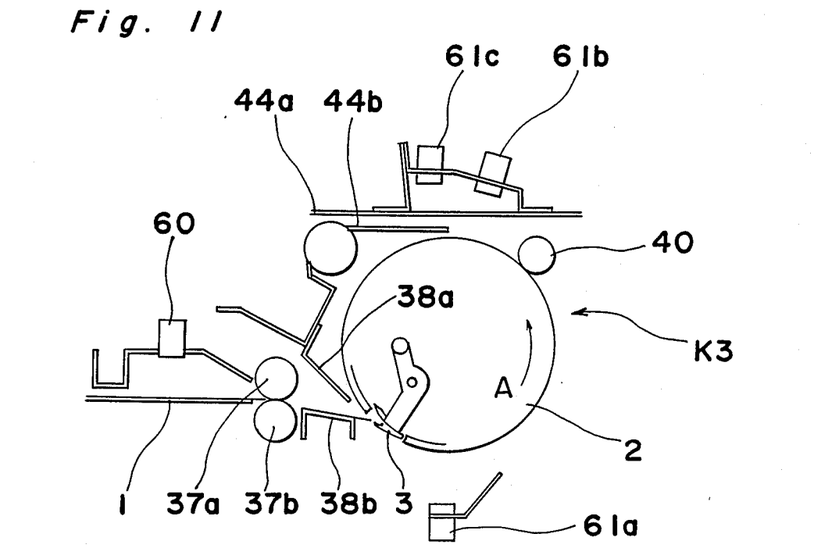
FIG. 11 is a schematic view of an ADF according to a third embodiment of the present invention.

Referring to FIG. 11, there is shown an autiomatic document feeder (ADF) K3 according to a third embodiment of the present invention. In the ADF K3, the original sheet 1 is wound around the circumferential face of the rotary drum 2. The ADF K3 includes a detecting device for detecting a transport state of the original sheet 1. The detecting device includes a sheet sensing member 60 and a central processing unit (CPU) 76 to be described later. Before the original sheet 1 reaches the rotary drum 2, a transport state of the original sheet 1 is detected by the sheet sensing member 60. Only when it is found by the sheet sensing member 60 that the transport state of the original sheet 1 is proper, the original sheet 1 is fed, via a pair of feed rollers 37a and 37b, through the inlet guides 38a and 38b. Then, the leading edge of the original sheet 1 is gripped by the claw 3 such that the original sheet 1 is wound around the rotary drum 2. Subsequently, when predetrmined operations such as exposure of the original sheet 1 have been performed, the original sheet 1 is discharged out of the ADF K3 through outlet guides 44a and 44b. The ADF K3 further includes a clamp roller 40 for clamping the original sheet 1 onto the circumferential face of the rotary drum 2 and sensors 61a, 61b and 61c which are provided around the rotary drum 2.

Figure 12:
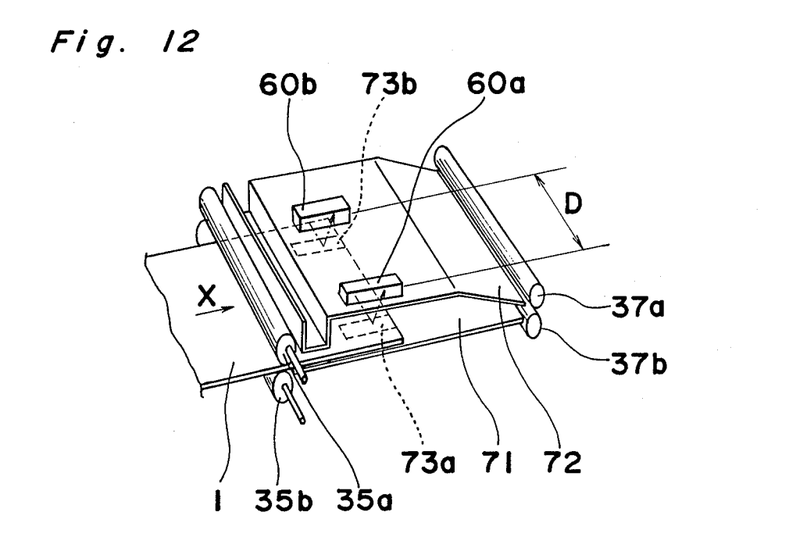
FIG. 12 is a perspective view of a detecting device for detecting a transport state of an original sheet, which is employed in the ADF of FIG. 11.

The detecting device referred to above will be described in detail with reference to FIG. 12, hereinbelow. The sheet sensing member 60 is constituted by sheet sensors 60a and 60b for detecting the transport state of the original sheet 1 before the original sheet 1 conveyed by a pair of feed rollers 35a and 35b is further conveyed to the rotary drum 2 by the feed rollers 37a and 37b. Namely, the original sheet 1 is transported, in the direction of the arrow X, between a base plate 71 and a shielding plate 72 confronting the base plate 71. The sheet sensors 60a and 60b are mounted on the shielding plate 72. It will be seen from FIG. 12 that the sheet sensors 60a and 60b are arranged in the direction intersecting with the transport direction X at right angles. Meanwhile, reflecting plates 73a and 73b are provided on the base plate 71 so as to confront the sheet sensors 60a and 60b, respectively. A distance D between the sheet sensors 60a and 60b is required to conform to a width of the original sheet 1. In the case where the original sheets 1 having different widths are transported, the distance D should correspond to the minimum width of the original sheets 1.

Figure 13:
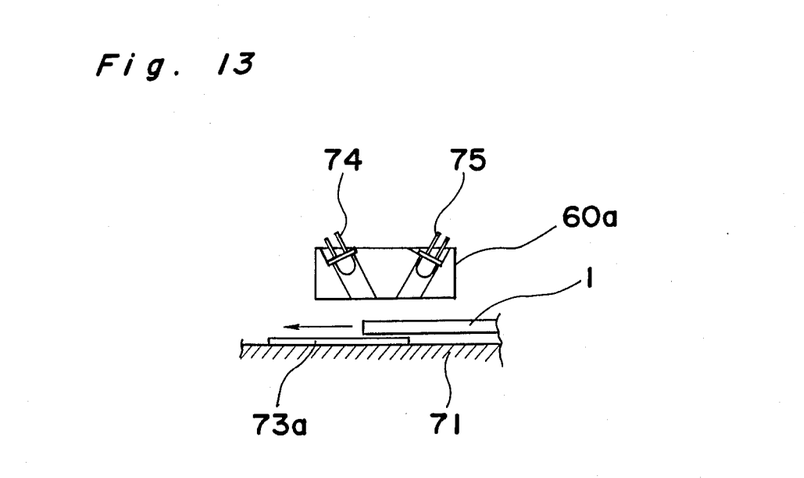
FIG. 13 is a schematic view of the detecting device of FIG. 12.

The transport state of the original sheet 1 is detected by the sheet sensors 60a and 60b and the reflecting plates 73a and 73b as shown in FIG. 13. Namely, as shown in FIG. 13, a projector 74 and a light receptor 75 are provided in the sheet sensor 60a. Light emitted from the projector 74 is reflected to the light reflector 75 by the reflecting plate 73a when the original sheet 1 is not disposed on the reflecting plate 73a. On the contrary, when the original sheet 1 is disposed on the reflecting plate 73a, light emitted from the projector 74 does not reach the light receptor 75. Accordingly, the presence and absence of the original sheet 1 on the reflecting plate 73a can be, respectively, determined by the absence and presence of a signal from the light receptor 75 after emission of light from the projector 74. It is to be noted that constructions of the other sheet sensor 60b are the same as those of the sheet sensor 60a.

Figure 14:
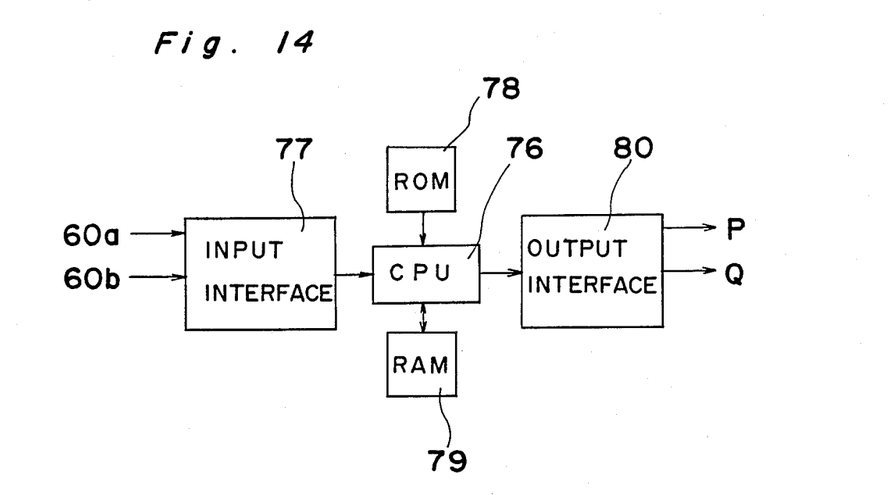
FIG. 14 is a block circuit diagram of the detecting device of FIG. 12.

FIG. 14 is a block circuit diagram of the detecting device. Output signals of the sheet sensors 60a and 60b are inputted to the central processing unit (CPU) 76 through an input interface 77. When the CPU 76 receives the signal from the input interface 77, the CPU 76 performs predetermined operations through utilization of time counting in a random access memory (RAM) 76 in accordance with a program stored in a read-only memory (ROM) 78. When the CPU 76 detects that the original sheet 1 is conveyed obliquely with respect to the transport direction X, the CPU 76 outputs, through an output interface 80, an alarm signal P and a stop signal Q for stopping transport of the original sheet 1. As a result, an alarm output member (not shown) outputs an alarm and automtic feed of the original sheet 1 is stopped. Thus, faulty operations such as jamming of the original sheet 1 can be prevented beforehand.

Figure 15:
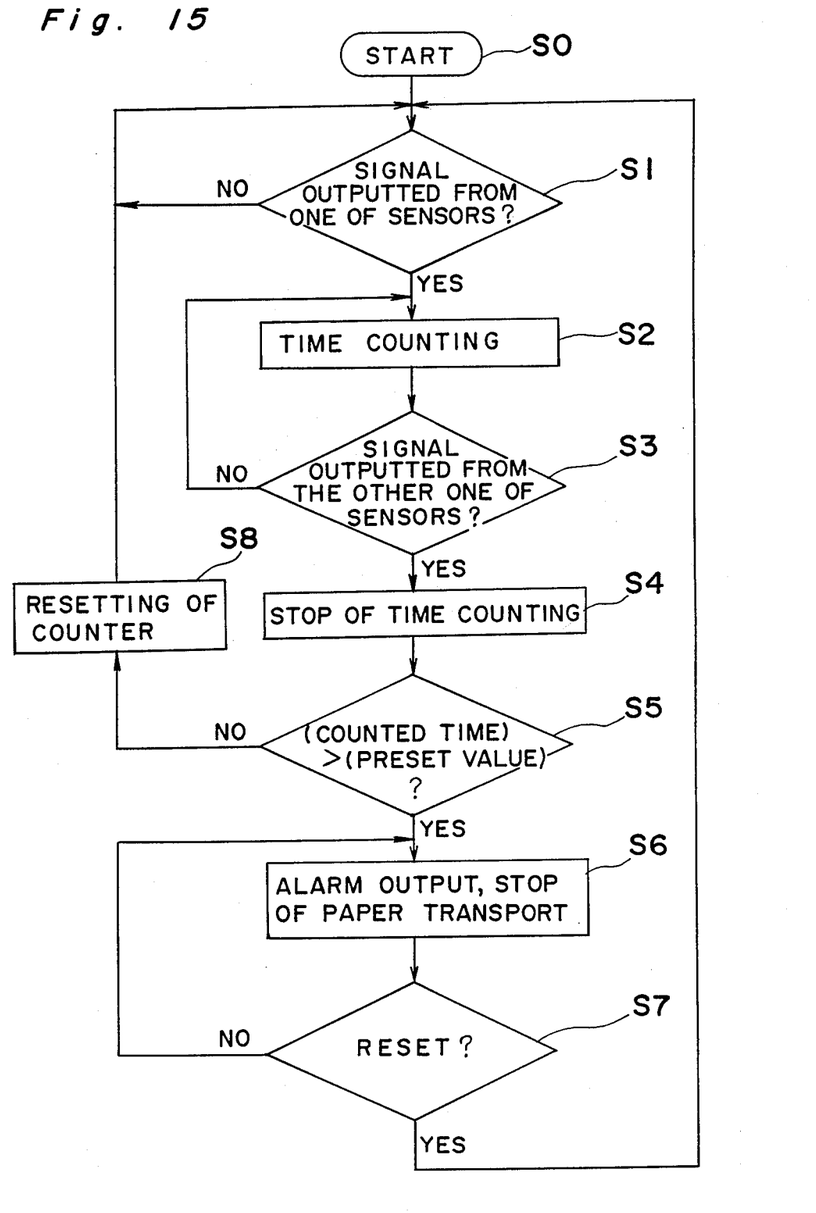
FIG. 15 is a flow chart of processing sequence of the detecting device of FIG. 12.

Hereinbelow, processing sequence of the above described operations of the detecting device will be described with reference to a flow chart of FIG. 15. The CPU 76 waits for the output signals from the sheet sensors 60a and 60b. If it is found at step S1 that the CPU 76 has received the output signal from one of the sheet sensors 60a and 60b, a reference clock starts time counting at step S2. Time counting of the reference clock is continued until the signal from the other one of the sheet sensors 60a and 60b is inputted to the CPU 76. If it is found at step S3 that the signal from the other one of the sheet sensors 60a and 60b has been inputted to the CPU 76, time counting of the reference clock is stopped at step S4. Then, a decision is made at step S5 as to whether or not a counted time is larger than a preset value (a permissible value). In the case of "NO" at step S5, the program flow proceeds to step S8 for resetting the reference clock and then, returns to step S1 such that the above described operations are repeated. On the other hand, in the case of 37 YES" at step S5, output of the alarm signal and stop of transport of the original sheet 1 are performed at step S6 since it is considered that faulty operations such as jamming of the original sheet 1 are likely to take place in the subsequent operations.

In the case of "YES" at step S5, it is concluded that a time duration between a point of time when the sheet sensor 60a detects the original sheet 1 and a point of time when the sheet sensor 60b detects the original sheet 1 is larger than a predetermined time period and thus, the original sheet 1 is conveyed obliquely with respect to the transport direction of the original sheet 1. Accordingly, when the program flow proceeds to step S6, an operation of the ADF K3 should remove the original sheet 1 conveyed obliquely with respect to the transport direction of the original sheet 1 and thus, a resetting signal is produced at step S7. After step S78 the program flow returns to step S1.

Meanwhile, in the above described embodiment of the ADF K3, the sheet sensors 60a and 60b are arranged in a direction orthogonal to the transport direction X of the original sheet 1. However, the sheet sensors 60a and 60b can also be arranged in a direction intersecting with the transport direction X at another angle. Furthermore, in the case where the number of the sheet sensors is two as in the above described embodiment, the sheet sensors are disposed at opposite sides of the original sheet. However, it can also be so arranged that three or more sheet sensors are provided so as to detect oblique transport of the original sheet at higher sensitivity.

As is clear from the foregoing description, the detecting device of the ADF K3 of the present invention comprises: the sheet sensing member 60 including a plurality of the sheet sensors 60a and 60b arranged in the direction intersecting with the transport direction X of the original sheet 1 in the transport path of the original sheet 1; and the detecting means 76 for detecting oblique transport of the original sheet 1 on the basis of difference in points of time when the sheet sensors have detected the original sheet 1. Accordingly, since oblique transport of the original sheet can be detected by the detecting device of the ADF K3 of the present invention, faulty operations such as jamming of the original sheet can be prevented beforehand.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic document feeder for automatically feeding an original sheet, comprising:
    a rotary drum rotatable in a copying direction;
    a claw provided on a circumferential face of said rotary drum for gripping the original sheet, said claw being rotatable with said rotary drum;
    sheet clamping means for clamping the original sheet against the circumferential face of said rotary drum, said sheet clamping means being mounted on a fixed member of said automatic document feeder and including a sheet clamp for clamping said original sheet wound around said circumferential face of said rotary drum, said sheet clamp being pivotably mounted on said fixed member so as to pivot about a shaft member engaged with said fixed member, an urging member for urging said original sheet towards said rotary drum, and a movable member which is movably mounted on said sheet clamp so as to be displaced to a position where said fixed member is gripped between said movable member and said clamp such that said sheet clamping means is mounted on said fixed member by said movable member;

an exposure device for subjecting the original sheet to exposure through said sheet clamping means;

a sheet clamping region defined by said sheet clamping means being held against a predetermined clamping area through which the circumferential face of said rotary drum passes during rotation in the copying direction; and an exposure region defined by said exposure device being directed at a predetermined exposure area through which the circumferential face of said rotary drum passes during rotation in the copying direction;

whereby said sheet clamping region is slightly spaced away from said exposure region in a direction opposite to the copying direction of said rotary drum such that said sheet clamping region occupies an initial portion of said exposure region for preventing the original sheet from deviating from said rotary drum at said exposure region.

2. An automatic document feeder as claimed in claim 1, wherein said urging member is a coiled spring.

* * * * *